(12) United States Patent
Zhang et al.

(10) Patent No.: US 12,744,726 B2
(45) Date of Patent: Sep. 22, 2026

(54) SYSTEMS AND METHODS FOR SERVICE INTERWORKING

(71) Applicant: Juniper Networks, Inc., Sunnyvale, CA (US)

(72) Inventors: Zhaohui Zhang, Westford, MA (US); Shraddha Hegde, Bangalore (IN); Krzysztof Grzegorz Szarkowicz, Vienna (AT)

(73) Assignee: Hewlett Packard Enterprise Development LP, Spring, TX (US)

( * ) Notice: Subject to any disclaimer, the term of this patent is extended or adjusted under 35 U.S.C. 154(b) by 383 days.

(21) Appl. No.: 18/478,599

(22) Filed: Sep. 29, 2023

(65) Prior Publication Data

US 2024/0305557 A1 Sep. 12, 2024

(30) Foreign Application Priority Data

Mar. 9, 2023 (IN) ............................. 202341015755

(51) Int. Cl.
*G06F 15/173* (2006.01)
*H04L 45/00* (2022.01)
*H04L 45/17* (2022.01)

(52) U.S. Cl.
CPC .............. *H04L 45/17* (2022.05); *H04L 45/20* (2013.01)

(58) Field of Classification Search
CPC ................................ H04L 45/17; H04L 45/20
USPC .......................................................... 709/224
See application file for complete search history.

(56) References Cited

U.S. PATENT DOCUMENTS

2021/0021513 A1* 1/2021 Filsfils .................. H04L 45/741
2022/0014460 A1* 1/2022 Filsfils .................... H04L 45/52

OTHER PUBLICATIONS

RFC 9252—BGP Overlay Services Based on Segment Routing over IPv6 (SRv6) (Year: 2022).*
Extended European Search Report for European Application No. EP23211384.5 dated May 23, 2024, 11 pages.
Filsfils, C., "Network Programming with SRv6", , Apr. 30, 2020 (Apr. 30, 2020), pp. 1-200, XPO93128113, Retrieved from the Internet: URL:https://orbi.uliege.be/bitstream/2268/245292/1/networkprogramming- phd-final.pdf [retrieved on Feb. 6, 2024].

* cited by examiner

*Primary Examiner* — Vivek Srivastava
*Assistant Examiner* — Karina J Garcia-Ching
(74) *Attorney, Agent, or Firm* — Harrity & Harrity, LLP

(57) ABSTRACT

An interworking network device receives from a first other network device associated with an MPLS domain, a route that includes a label, a prefix, and a next-hop identifier that indicates the first other network device. The interworking network device thereby generates a prefix SID attribute that includes a SID value and information indicating a structure of the SID value, wherein a LOC portion of the SID value identifies the interworking network device, and a first sub-portion of a FUNCT portion of the SID value identifies an endpoint behavior of the interworking network device in association with the first other network device. The interworking network device modifies the route to cause the next-hop identifier to indicate the interworking network device, and to cause the route to include the prefix SID attribute. The interworking network device thereby sends the route to a second other network device associated with an SRv6 domain.

20 Claims, 10 Drawing Sheets

Additional Route
<300, SIDaddr, IWND>

200

400

SYSTEMS AND METHODS FOR SERVICE INTERWORKING

CROSS-REFERENCE TO RELATED APPLICATION

This Patent Application claims priority to Indian Patent Application No. 202341015755, filed on Mar. 9, 2023, and entitled "SYSTEMS AND METHODS FOR SERVICE INTERWORKING." The disclosure of the prior Application is considered part of and is incorporated by reference into this Patent Application.

BACKGROUND

An interworking network device facilitates communications and data exchanges between different types of network technologies or protocols.

SUMMARY

In some implementations, a method includes receiving, by an interworking network device, from a first other network device associated with a multi-protocol label switching (MPLS) domain, a route that includes a label, a prefix, and a next-hop identifier that indicates the first other network device; generating, by the interworking network device and based on receiving the route, a prefix segment identifier (SID) attribute that includes a SID value and information indicating a structure of the SID value, wherein a LOC portion of the SID value identifies the interworking network device, and a first sub-portion of a FUNCT portion of the SID value identifies an endpoint behavior of the interworking network device in association with the first other network device; modifying, by the interworking network device, the route to cause the next-hop identifier to indicate the interworking network device, and to cause the route to include the prefix SID attribute; and sending, by the interworking network device and based on modifying the route, the route to a second other network device associated with a segment routing over Internet protocol (IP) version 6 (SRv6) domain.

In some implementations, a non-transitory computer-readable medium storing a set of instructions includes one or more instructions that, when executed by one or more processors of an interworking network device, cause the interworking network device to: receive, from a first other network device associated with an SRv6 domain, a route that includes a label, a prefix, a next-hop identifier that indicates the first other network device, and a prefix SID attribute that includes a SID value and information indicating a structure of the SID value; modify the route to cause the next-hop identifier to indicate an address associated with the SID value, and to cause the route to not include the prefix SID attribute; and send, based on modifying the route, the route to a second other network device associated with an MPLS domain.

In some implementations, an interworking network device includes one or more memories; and one or more processors to: receive, from a first other network device associated with an SRv6 domain, a route that includes a label, a prefix, a next-hop identifier that indicates the first other network device, and a prefix SID attribute that includes a SID value and information indicating a structure of the SID value; generate, based on receiving the route, a composite tunnel in a tunnel encapsulation attribute that includes an identifier of the interworking network device, and a particular label allocated for the SID value included in the prefix SID attribute; modify the route to cause the next-hop identifier to indicate the interworking network device, and to cause the route to further include the tunnel encapsulation attribute and to not include the prefix SID attribute; and send, based on modifying the route, the route to a second other network device associated with an MPLS domain.

DETAILED DESCRIPTION

Figure 1A:
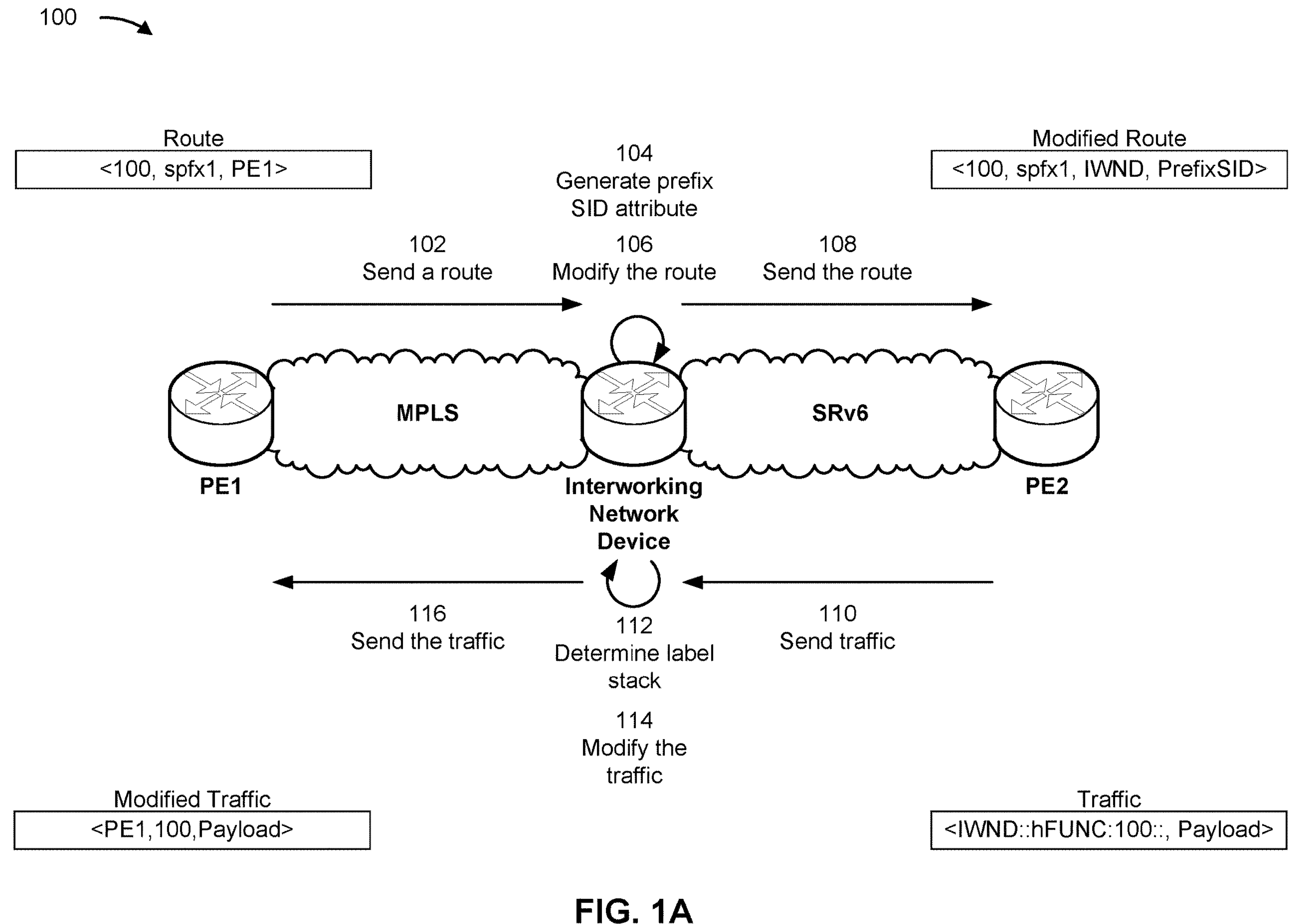
FIGS. 1A-1D are diagrams of an example implementation associated with service interworking.

The following detailed description of example implementations refers to the accompanying drawings. The same reference numbers in different drawings may identify the same or similar elements.

Segment Routing (SR) allows source network devices to steer packets through SR paths. SR can be implemented over Internet protocol version 6 (IPv6) or multi-protocol label switching (MPLS). When SR is implemented over IPv6, it is called SRv6. When SR is implemented over MPLS, it is called SR-MPLS. An interworking network device can provide interworking between an SR-MPLS domain (hereinafter referred to as an MPLS domain) and an SRv6 domain.

In some cases, to enable interworking, an interworking network device re-advertises routes (e.g., service routes) received from an MPLS domain to an SRv6 domain with an SRv6 service security identifier (SID) and with an indication that a next-hop is the interworking network device. The SID maps to a <label, next-hop> tuple as received from the MPLS domain. For traffic (e.g., service traffic) from the SRv6 domain, the incoming SID maps to a <base tunnel to next-hop, label> forwarding state in the MPLS domain. Additionally, the interworking network device can re-advertise routes (e.g., service routes) received from the SRv6 domain to the MPLS domain with an MPLS label and with a next-hop set to the interworking node. The MPLS label maps to the service SID as received from the SRv6 domain. For traffic (e.g., service traffic) from the MPLS domain, a label of the traffic maps to a corresponding forwarding state in the SRv6 domain. Consequently, the interworking node must maintain a per-service label/SID forwarding state, which requires consumption of computing resources (e.g., processing resources, memory resources, communication resources, and/or power resources, among other examples) of the interworking node. This impacts a performance of the interworking node.

Some implementations described herein include an interworking network device. The interworking network device receives, from an MPLS network device, a route that includes a label, a prefix, and a next-hop identifier that indicates the MPLS network device. The interworking network device thereby generates a prefix SID attribute that includes a SID value and information indicating a structure of the SID value. In some implementations, a LOC portion of the SID value identifies the interworking network device, and a first sub-portion of a FUNCT portion of the SID value identifies an endpoint behavior of the interworking network device in association with the MPLS network device. The interworking network device then modifies the route to cause the next-hop identifier to indicate the interworking network device, and to cause the route to include the prefix SID attribute. Thereafter, the interworking network device sends the route to an SRv6 network device.

Accordingly, the interworking network device receives, from the SRv6 network device, traffic that includes another SID value and a payload (e.g., encapsulated in IPv6). A LOC portion of the other SID value identifies the interworking network device, and a first sub-portion of a FUNCT portion of the other SID value identifies the endpoint behavior of the interworking network device in association with the MPLS network device. The interworking network device determines, based on the first sub-portion of the FUNCT portion of the other SID value (e.g., based on performing endpoint behavior), a label stack associated with a tunnel between the interworking network device and the MPLS network device. The interworking network device then modifies the traffic to cause the traffic to be decapsulated and to include, along with the payload, the label stack and a second sub-portion of the FUNCT portion of the other SID value as an additional label following the label stack, and to not include the other SID. The interworking network device sends the traffic to the first other network device via the tunnel between the interworking network device and the first other network device.

Additionally, in some implementations, the interworking network device receives, from the SRv6 network device, a route that includes a label, a prefix, a next-hop identifier that indicates the SRv6 network device, and a prefix SID attribute that includes a SID value and information indicating a structure of the SID value.

In a first example, the interworking network device may modify the route to cause the next-hop identifier to indicate an address associated with the SID value, and to cause the route to not include the prefix SID attribute. The interworking network device then may send the route to an MPLS network device. The interworking network device may generate an additional route that includes another label, another prefix for the address associated with the SID value, and another next-hop identifier that indicates the interworking network device, and may send the additional route to the MPLS network device.

In a second example, the interworking network device may generate, based on receiving the route, a composite tunnel in a tunnel encapsulation attribute that includes an identifier of the interworking network device, and a particular label allocated for the SID value included in the prefix SID attribute. The interworking network device may modify the route to cause the next-hop identifier to indicate the interworking network device, and to cause the route to further include the tunnel encapsulation attribute and to not include the prefix SID attribute. The interworking network device may thereby send the route to the MPLS network device.

In this way, the interworking network device allows the MPLS network device to obtain a route regardless of whether the MPLS network device supports IPv4 or IPv6. Accordingly, the interworking network device receives, after sending the route to the MPLS network device (e.g., in both examples), traffic that includes a tunnel label associated with a tunnel from the MPLS network device to the interworking network device, a first label, a second label, and a payload. When the MPLS network device received the route according to the first example, the first label includes the other label of the additional route generated by the interworking network device, and the second label includes the label of the route. When the MPLS network device received the route according to the second example, the first label includes the particular label of the tunnel encapsulation attribute, and the second label includes the label of the route.

The interworking network device then identifies, based on the first label, the SID value and the information indicating the structure of the SID value and thereby modifies the SID value to include the second label. The interworking network device then modifies the traffic to cause the payload to be encapsulated in IPv6 with the SID value in an IPv6 header (and to not include the tunnel label, the first label, and the second label). The interworking network device thereafter sends the traffic to the MPLS network device.

In this way, some implementations described herein allow the interworking network device to not maintain a per-service label/SID forwarding state (e.g., to facilitate forwarding traffic from between an MPLS domain and an SRv6 domain). Accordingly, the interworking network device does not need to consume computing resources (e.g., processing resources, memory resources, communication resources, and/or power resources, among other examples) to maintain a per-service label/SID forwarding state, and therefore provides an improved performance as compared to an interworking network device that does maintain a per-service label/SID forwarding state.

FIGS. 1A-1D are diagrams of an example implementation 100 associated with service interworking. As shown in FIGS. 1A-1D, example implementation 100 includes a plurality of network devices, such as a plurality of PE network devices (shown as PE network device PE1 and PE network device PE 2) and an interworking network device. These devices are described in more detail below in connection with FIGS. 2-4.

As shown in FIGS. 1A-1D, the PE network device PE1 may be associated with an MPLS domain, such as an MPLS IPv4 domain or an MPLS IPv6 domain, and the PE network device PE2 may be associated with an SRv6 domain. The interworking network device may be associated with both the MPLS domain and the SRv6 domain.

As shown in FIG. 1A, and by reference number 102, the PE network device PE1 may send a route (e.g., a service route) to the interworking network device (e.g., via a tunnel between the PE network device PE1 and the interworking network device). For example, the PE network device PE1 may send the route to the interworking network device to distribute the route to other network devices, such as the PE network device PE2. Accordingly, the interworking network device may receive the route from the PE network device PE1 (e.g., as a result of the PE network device PE1 sending the route). The route may be an network layer reachability information (NLRI) message and/or may include, for example, a label (e.g., that is associated with a service, such as a virtual private network (VPN)), a prefix (e.g., that is associated with one or more addresses, such as a range of IP addresses, associated with the service), and a next-hop identifier that indicates the PE network device PE1 (e.g., that identifies an address, such as an IP address, of the PE network device PE1). As a specific example, as shown in FIG. 1A, the route may be a tuple <100, spfx1, PE1>, where 100 is a label, spfx1 is a prefix, and PE1 is a next-hop identifier indicating the PE network device PE1.

As shown by reference number 104, the interworking network device may generate a prefix SID attribute (e.g., based on receiving the route from the PE network device PE1). The prefix SID attribute may include a SID value and information indicating a structure of the SID value. In some implementations, the prefix SID attribute may include an SRv6 service TLV (e.g., an SRv6 L3 Service TLV or an SRv6 L2 Service TLV), which may include an SRv6 SID Information sub-TLV (e.g., that includes the SID value) and an SRv6 SID Structure sub-sub-TLV (e.g., that includes the information indicating the structure of the SID value). The SID value may include a plurality of portions, such as a locator (LOC) portion and a function (FUNCT) portion, and, in some implementations, an arguments (ARG) portion (e.g., formatted as LOC:FUNCT:ARG). The LOC portion of the SID value may identify the interworking network device (e.g., may identify an address, such as an IP address, of the interworking network device). A first sub-portion of the FUNCT portion (e.g., comprising the "high" bits of the FUNCT portion) may include information identifying an endpoint behavior of the interworking network device (e.g., in association with other PE network devices, such as the PE network device PE1). The endpoint behavior may be an END.DBS behavior, which may indicate that the interworking network device is to perform a decapsulate, bind, and shift (DBS) behavior (e.g., when receiving traffic associated with the route, as further described herein). The interworking network device may save, in a data structure, information associating the endpoint behavior with the PE network device PE1 (e.g., by saving an entry that indicates a label stack associated with the PE1, such as a label stack associated with the tunnel between the PE network device PE1 and the interworking network device, and the endpoint behavior). The information indicating the structure of the SID value may indicate that the LOC portion of the SID value identifies the interworking network device and/or that the first sub-portion of the FUNCT portion identifies the endpoint behavior of the interworking network device.

As shown by reference number 106, the interworking network device may modify the route (e.g., that the interworking network device received from the PE network device PE 1). For example, the interworking network device may cause the next-hop identifier to indicate the interworking network device (e.g., indicate an address, such as the IP address, of the interworking network device). That is, the interworking network device may modify the route to cause the next-hop identifier to indicate only the interworking network device (e.g., to not indicate the PE network device PE1). In some implementations, the interworking network device may modify the route to cause the route to include the prefix SID attribute (e.g., that includes the SID value and the information indicating the structure of the SID value). As a specific example, as shown in FIG. 1A, the interworking network device may modify the route such that the route is a tuple <100, spfx1, IWND, PrefixSID>, where 100 is the label, spfx1 is the prefix, IWND is the next-hop identifier indicating the interworking network device, and PrefixSID is the prefix SID attribute.

As shown by reference number 108, the interworking network device may send the route to the PE network device PE2 (e.g., based on modifying the route). For example, the interworking network device may send the route (e.g., after modifying the route) to the PE network device PE2 as part of a re-advertising process to distribute the route to other network devices (e.g., other PE network devices) connected to the interworking network device that are not associated with the MPLS domain. Accordingly, the PE network device PE2 may receive the route from the interworking network device (e.g., as a result of the interworking network device sending the route).

As further shown in FIG. 1A, and by reference number 110, the PE network device PE2 may send traffic (e.g., that is associated with a service that is provided by the PE network device PE1) that is destined for the PE network device PE1. Accordingly, the PE network device PE2 may send the traffic to the interworking network device (e.g., as an initial hop along a path to the PE network device PE1). In this way, the interworking network device may receive the traffic from the PE network device PE2 (e.g., as a result of the PE network device PE2 sending the traffic).

The traffic may include (e.g., in a header, such as an IPv6 header, of one or more packets of the traffic) a SID value (e.g., that is different than the SID value that is included in the SID prefix attribute, described above) and a payload (e.g., encapsulated in IPv6). The SID value may include a plurality of portions, such as a LOC portion and a FUNCT portion, and, in some implementations, an ARG portion (e.g., formatted as LOC:FUNCT:ARG, such as in a similar manner to that described above). The LOC portion of the SID value may identify the interworking network device (e.g., may identify an address, such as an IP address, of the interworking network device). A first sub-portion of the FUNCT portion (e.g., comprising the "high" bits of the FUNCT portion) may include information identifying an endpoint behavior of the interworking network device (e.g., in association with other PE network devices, such as the PE network device PE1) and a second sub-portion of the FUNCT portion (e.g., comprising the "low" bits of the FUNCT portion) may include information identifying a label (e.g., that was allocated by the PE network device PE1). As a specific example, as shown in FIG. 1A, the traffic may be a tuple <IWND::hFUNC:100::, Payload>, where IWND::hFUNC100 is the SID value (e.g., where the FUNCT portion of the SID value is IWND to identify the interworking network device, the high bits of the FUNCT portion is hFUNC to identify the endpoint behavior of the interworking network device, and the "low" bits of the FUNCT portion is 100 to indicate the label allocated by the PE network device PE1) and Payload is the payload of the traffic.

As shown by reference number 112, the interworking network device, may determine (e.g., based on the traffic) a label stack. The label stack may be associated with the PE network device PE1. For example, the label stack may identify the tunnel between the interworking network device and the PE network device PE1. In some implementations, the interworking network device may determine the label stack based on the first sub-portion of the FUNC portion of the SID value of the traffic. For example, the interworking network device may determine based on the first sub-portion of the FUNCT portion of the SID value of the traffic, the endpoint behavior of the interworking network device. Accordingly, the interworking network device may perform the endpoint behavior (e.g., the End.DBS behavior) and may therefore identify the label stack (e.g., by communicating with the data structure as part of performing the endpoint behavior).

As shown by reference number 114, the interworking network device may modify the traffic. For example, the interworking network device may decapsulate the traffic. Additionally, or alternatively, the interworking network device may modify the traffic to include, along with the payload, the label stack and the second sub-portion of the FUNCT portion of the SID value of the traffic (e.g., that indicates the label allocated by the PE network device PE1) as a label (e.g., that follows the label stack). Further, the interworking network device may cause the traffic to not include the SID value (e.g., by removing the SID value from the traffic). As a specific example, as shown in FIG. 1A, the interworking network device may modify the traffic such that the traffic is a tuple <PE1, 100, Payload>, where PE1 is the label stack (e.g., that identifies the tunnel between the interworking network device and the PE network device PE1), 100 is the label, and Payload is the payload of the traffic.

As shown by reference number 116, the interworking network device may send the traffic to the PE network device PE1 (e.g., based on modifying the traffic). For example, the interworking network device may send the traffic (e.g., after modifying the traffic) to the PE network device PE1 (e.g., as a next hop along the path to the PE network device PE1). Accordingly, the PE network device PE 1 may receive the traffic from the interworking network device (e.g., as a result of the interworking network device sending the traffic).

Figure 1B:
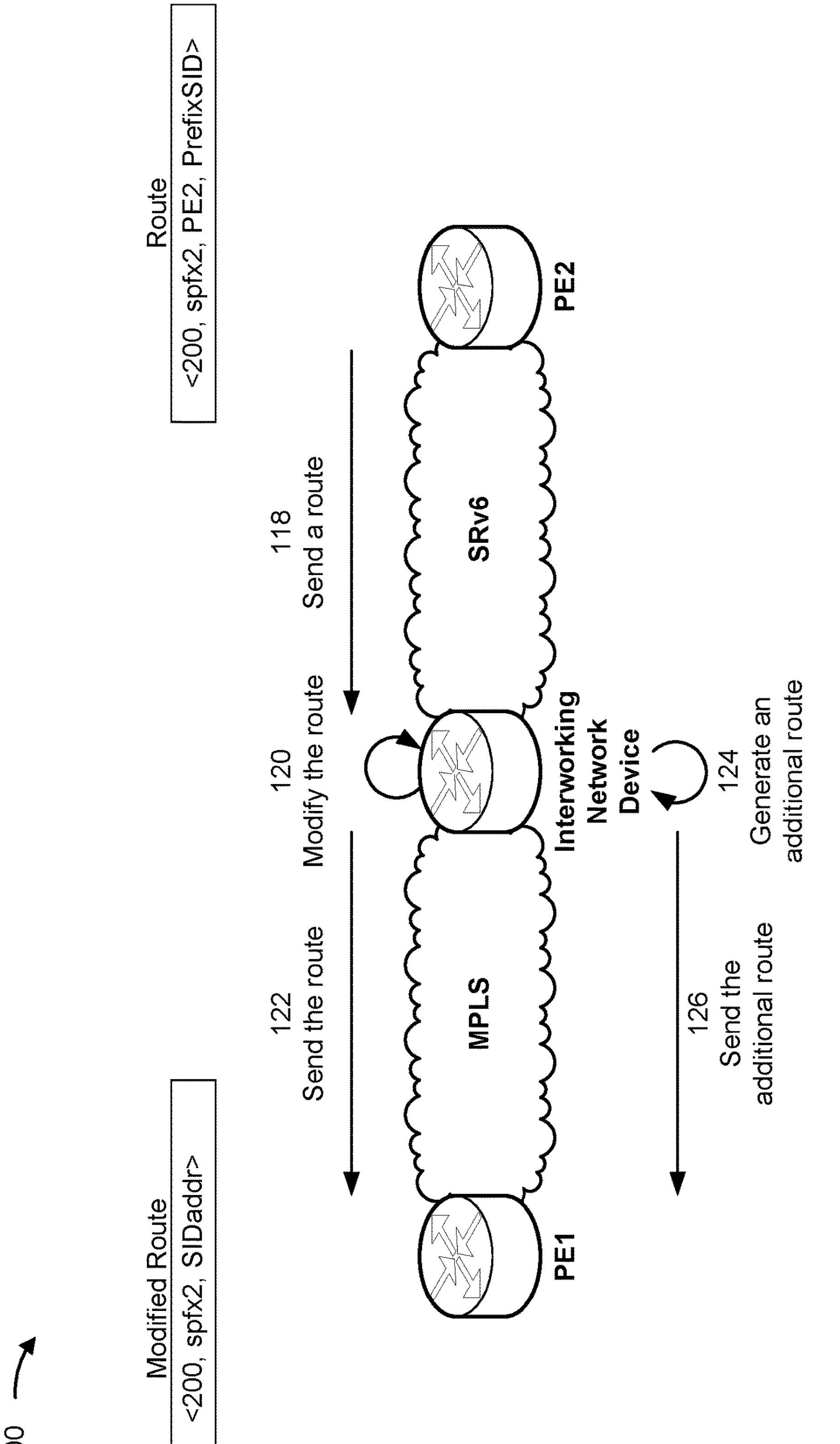

As shown in FIG. 1B, and by reference number 118, the PE network device PE2 may send a route (e.g., a service route) to the interworking network device (e.g., via a link between the PE network device PE2 and the interworking network device). For example, the PE network device PE2 may send the route to the interworking network device to distribute the route to other network devices, such as the PE network device PE1. Accordingly, the interworking network device may receive the route from the PE network device PE2 (e.g., as a result of the PE network device PE2 sending the route).

The route may be an NLRI message and/or may include, for example, a label (e.g., that is associated with a service, such as a VPN), a prefix (e.g., that is associated with one or more addresses, such as a range of IP addresses, associated with the service), a next-hop identifier that indicates the PE network device PE2 (e.g., that identifies an address, such as an IP address, of the PE network device PE2), and a prefix SID attribute that includes a SID value and information indicating a structure of the SID value. The SID value may include a plurality of portions, such as a LOC portion and a FUNCT portion, and, in some implementations, an ARG portion (e.g., formatted as LOC:FUNCT:ARG). The LOC portion of the SID value may identify the interworking network device (e.g., may identify an address, such as an IP address, of the interworking network device). The information indicating the structure of the SID value may indicate that the LOC portion of the SID value identifies the interworking network device. As a specific example, as shown in FIG. 1B, the route may be a tuple <200, spfx2, PE2, PrefixSID>, where 200 is a label, spfx2 is a prefix, and PE2 is a next-hop identifier indicating the PE network device PE2, and PrefixSID is the prefix SID attribute.

As shown by reference number 120, the interworking network device may modify the route (e.g., that the interworking network device received from the PE network device PE2). For example, the interworking network device may cause the next-hop identifier to indicate an address associated with the SID value that is included in the prefix SID attribute (e.g., the SID value itself, such as when the PE network device PE1 is associated with an MPLS IPv6 domain; or the information included in the LOC portion of the SID value). That is, the interworking network device may modify the route to cause the next-hop identifier to indicate only the address associated with the SID value (e.g., to not indicate the PE network device PE2). Accordingly, when the LOC portion of the SID value indicates the interworking network device, the interworking network device may cause the next-hop identifier to indicate the interworking network device (e.g., to indicate an address, such as the IP address, of the interworking network device). Additionally, or alternatively, the interworking network device may modify the route to cause the route to not include the prefix SID attribute. As a specific example, as shown in FIG. 1B, the interworking network device may modify the route such that the route is a tuple <200, spfx2, SIDaddr>, where 200 is the label, spfx2 is the prefix, and SIDaddr is the next-hop identifier indicating the address associated with the SID value.

As shown by reference number 122, the interworking network device may send the route to the PE network device PE1 (e.g., based on modifying the route). For example, the interworking network device may send the route (e.g., after modifying the route) to the PE network device PE1 as part of a re-advertising process to distribute the route to other network devices (e.g., other PE network devices) connected to the interworking network device that are not associated with the SRv6 domain. Accordingly, the PE network device PE1 may receive the route from the interworking network device (e.g., as a result of the interworking network device sending the route).

As shown by reference number 124, the interworking network device may generate an additional route (e.g., based on receiving the route from the PE network device PE2 and/or based on modifying and/or sending the route to the PE network device PE1). The additional route may be referred to as an underlay route (e.g., an underlay labeled prefix route). The additional route may include a first other label (e.g., that is allocated by the interworking network device), a second other label (e.g., that indicates the address associated with the SID value), and another next-hop identifier that indicates the interworking network device. As a specific example, as shown in FIG. 1B, the other route may be a tuple <300, SIDaddr, IWND>, where 300 is the first other label, SIDaddr is the second other label indicating the address associated with the SID value, and IWND is the next-hop identifier indicating the interworking network device.

In some implementations, in association with modifying the route and/or generating the additional route, the interworking network device may update a data structure. For example, the interworking network device may store the first other label (e.g., that is allocated by the interworking network device) and the second other label (e.g., that indicates the address associated with the SID value) in an entry of the data structure. In this way, the entry may associate the first other label with the SID value (e.g., when the address associated with the SID value is the SID value), or to the address associated with the SID value. In some implementations, the entry may include the information indicating the structure of the SID value (e.g., that is included in the prefix SID attribute).

As shown by reference number 126, the interworking network device may send the additional route to the PE network device PE 1. For example, the interworking network device may send the additional route to the PE network device PE1 in association with modifying and sending the route to the PE network device PE1 (e.g., as described herein in relation to reference numbers 120 and 122). Accordingly, the PE network device PE1 may receive the additional route from the interworking network device (e.g., as a result of the interworking network device sending the additional route).

Figure 1C:
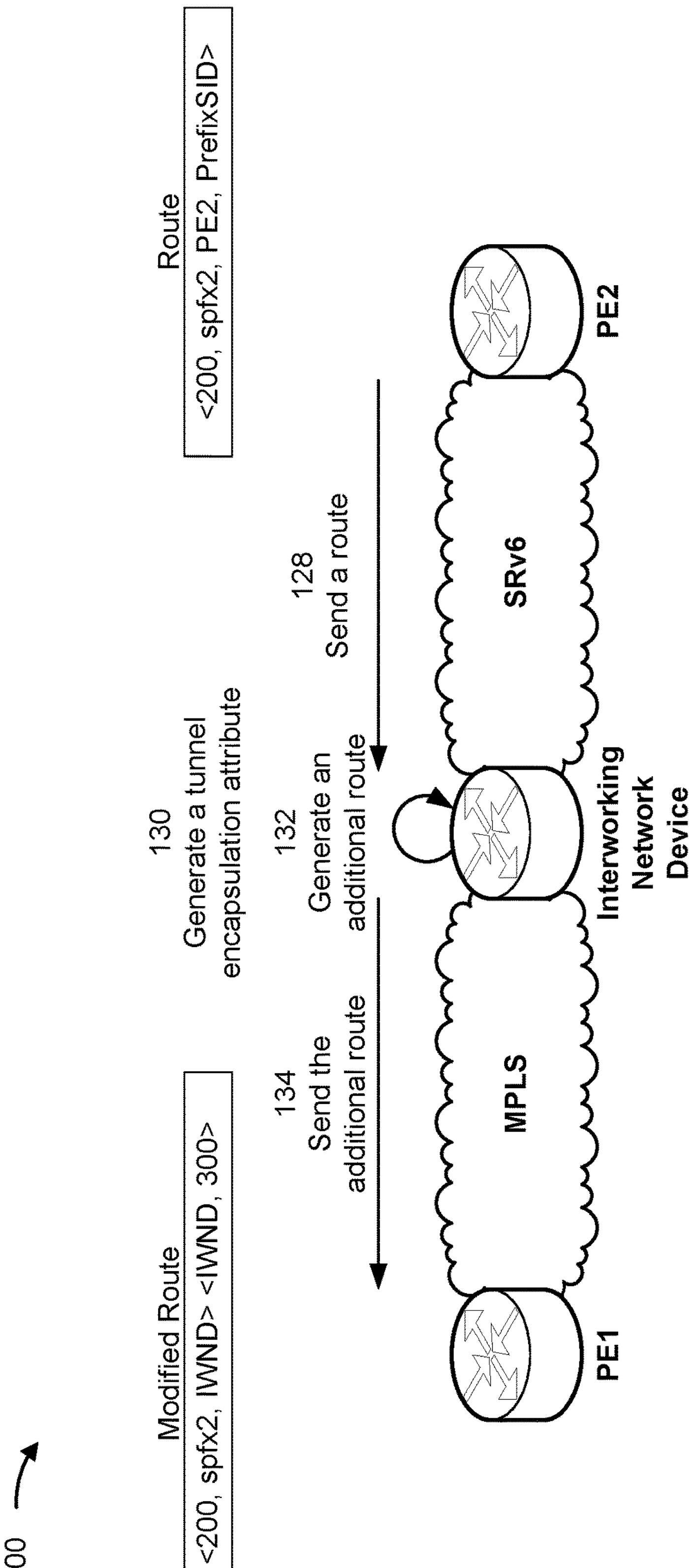

As an alternative to the operations shown in FIG. 1B, one or more of the operations shown in FIG. 1C may be performed by the interworking network device, the PE network device PE1, and/or the PE network device PE network device PE2.

As shown in FIG. 1C, and by reference number 128, the PE network device PE2 may send a route (e.g., a service route) to the interworking network device (e.g., via a link between the PE network device PE2 and the interworking network device). For example, the PE network device PE2 may send the route to the interworking network device to distribute the route to other network devices, such as the PE network device PE1. Accordingly, the interworking network device may receive the route from the PE network device PE2 (e.g., as a result of the PE network device PE2 sending the route).

The route may be an NLRI message and/or may include, for example, a label (e.g., that is associated with a service, such as a VPN), a prefix (e.g., that is associated with one or more addresses, such as a range of IP addresses, associated with the service), a next-hop identifier that indicates the PE network device PE2 (e.g., that identifies an address, such as an IP address, of the PE network device PE2), and a prefix SID attribute that includes a SID value and information indicating a structure of the SID value. The SID value may include a plurality of portions, such as a LOC portion and a FUNCT portion, and, in some implementations, an ARG portion (e.g., formatted as LOC:FUNCT:ARG). The LOC portion of the SID value may identify the interworking network device (e.g., may identify an address, such as an IP address, of the interworking network device). The information indicating the structure of the SID value may indicate that the LOC portion of the SID value identifies the interworking network device. As a specific example, as shown in FIG. 1C, the route may be a tuple <200, spfx2, PE2, PrefixSID>, where 200 is a label, spfx2 is a prefix, and PE2 is a next-hop identifier indicating the PE network device PE2, and PrefixSID is the prefix SID attribute.

As shown in FIG. 1C, and by reference number 130, the interworking network device may generate (e.g., based on receiving the route from the PE network device PE2) a tunnel encapsulation attribute (e.g., a composite tunnel in a tunnel encapsulation attribute). The tunnel encapsulation attribute may include an identifier of the interworking network device (e.g., an address, such as an IP address, of the interworking network device) and may include another label (e.g., allocated by the interworking network device) for the SID value included in the prefix SID.

As shown by reference number 132, the interworking network device may modify the route (e.g., that the interworking network device received from the PE network device PE2). For example, the interworking network device may cause the next-hop identifier to indicate the interworking network device (e.g., an address, such as an IP address, of the interworking network device). That is, the interworking network device may modify the route to cause the next-hop identifier to indicate only the interworking network device (e.g., to not indicate the PE network device PE2). In some implementations, the interworking network device may cause the route to further include the tunnel encapsulation attribute. Additionally, or alternatively, the interworking network device may modify the route to cause the route to not include the prefix SID attribute. As a specific example, as shown in FIG. 1C, the interworking network device may modify the route such that the route is a tuple <200, spfx2, IWND>, <IWND, 300> where 200 is the label, spfx2 is the prefix, IWND is the next-hop identifier indicating the interworking network device, and <IWND, 300> is the tunnel encapsulation attribute.

In some implementations, in association with generating the tunnel encapsulation attribute and/or modifying the route, the interworking network device may update a data structure. For example, the interworking network device may store the label (e.g., that is allocated by the interworking network device) and the label of tunnel encapsulation attribute (e.g., for the SID value included in the prefix SID) in an entry of the data structure. In this way, the entry may associate the label with the SID value. In some implementations, the entry may include the information indicating the structure of the SID value (e.g., that is included in the prefix SID attribute).

As shown by reference number 134, the interworking network device may send the route to the PE network device PE1 (e.g., based on modifying the route). For example, the interworking network device may send the route (e.g., after modifying the route) to the PE network device PE1 as part of a re-advertising process to distribute the route to other network devices (e.g., other PE network devices) connected to the interworking network device that are not associated with the SRv6 domain. Accordingly, the PE network device PE1 may receive the route from the interworking network device (e.g., as a result of the interworking network device sending the route).

Figure 1D:
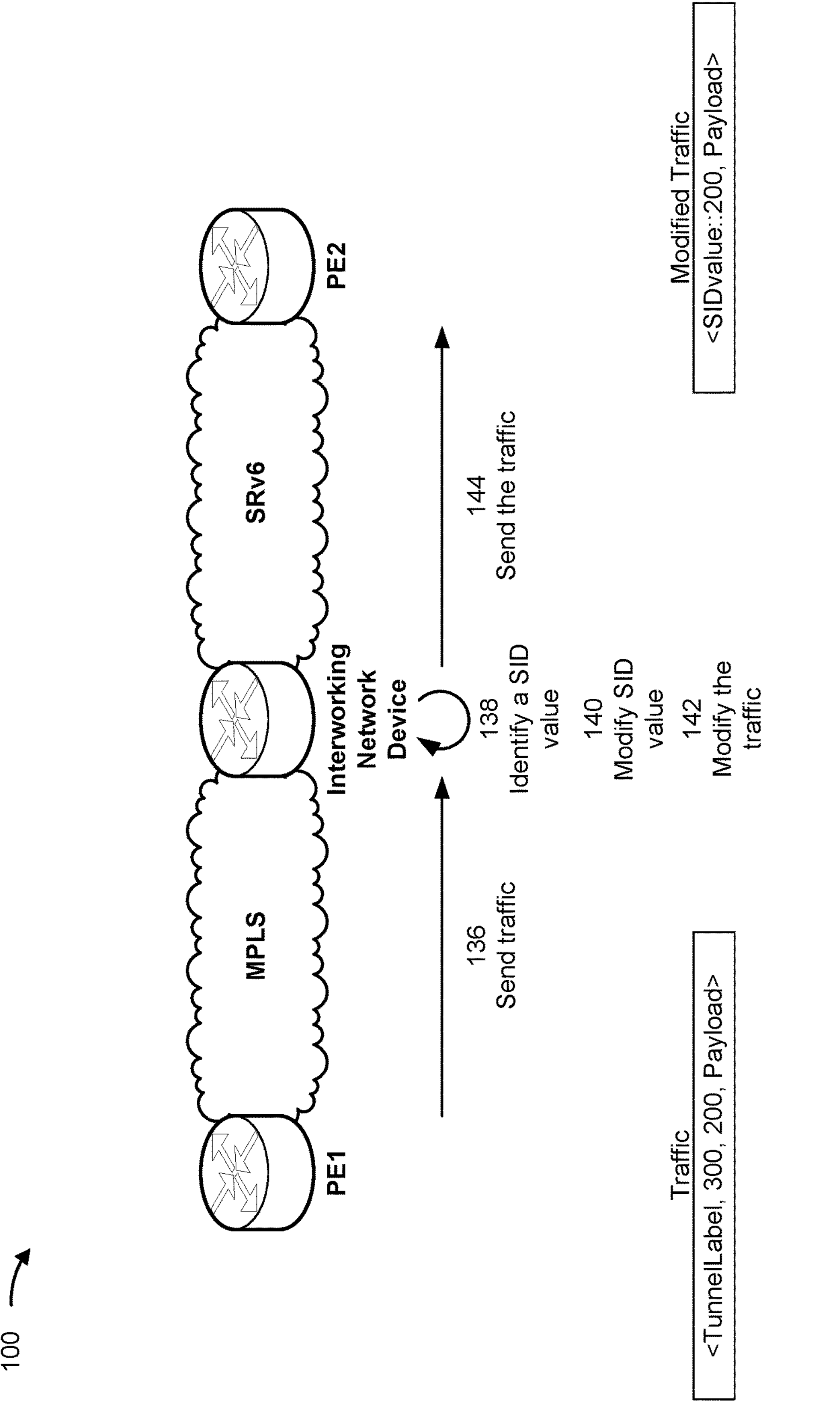

As shown in FIG. 1D and by reference number 136, the PE network device PE1 may send traffic (e.g., that is associated with a service that is provided by the PE network device PE2) that is destined for the PE network device PE2. Accordingly, the PE network device PE2 may send the traffic to the interworking network device (e.g., as an initial hop along a path to the PE network device PE2). In this way, the interworking network device may receive the traffic from the PE network device PE1 (e.g., as a result of the PE network device PE1 sending the traffic).

The traffic may include a tunnel label (e.g., that is associated with a tunnel from the PE network device PE1 to the interworking network device), a first label, a second label, and a payload. When the interworking network device sends a route and an additional route to the PE network device PE1 (e.g., as described herein in relation to FIG. 1B), the first label may include a label of the additional route (e.g., that was allocated by the interworking network device when generating the additional route) and the second label may include a label of the route (e.g., that was included in the route when received by the interworking network device). When the interworking network device modifies a route (e.g., from the PE network device PE2) to include a tunnel encapsulation attribute (e.g., as described herein in relation to FIG. 1C), the first label may include a label (e.g., for a SID value) of the tunnel encapsulation attribute (e.g., of the composite tunnel of the tunnel encapsulation attribute) and the second label may include a label of the route (e.g., that was included in the route when received by the interworking network device). As a specific example, as shown in FIG. 1D, the traffic may be a tuple <TunnelLabel, 300, 200, Payload>, where TunnelLabel is the tunnel label (e.g., for the tunnel from the PE network device PE1 to the interworking network device), 300 is the first label (e.g., that originated from a label of the additional route, as described herein in relation to FIG. 1B; or that originated from a label of the tunnel encapsulation attribute, as described herein in relation to FIG. 1C), 200 is the second label (e.g., that originated from a label of the route, as described herein in relation to FIGS. 1B-1C); and Payload is the payload of the traffic.

As shown by reference number 138, the interworking network device may identify a SID value (e.g., based on the first label of the traffic). For example, the interworking network device may search, based on the first label of the traffic, a data structure to identify an entry that indicates a SID value (and information indicating a structure of the SID value). The SID value (and the information indicating the structure of the SID value) may have been included in a prefix SID attribute received by the interworking network device (e.g., from the PE network device PE2), and saved by the interworking network device, as described herein in relation to FIGS. 1B and 1C.

As shown by reference number 140, the interworking network device may modify the SID value (e.g., based on identifying the SID value and/or the information indicating the structure of the SID value). The interworking network device may modify the SID value to include the second label. For example, the interworking network device may include the second label at a particular position of the SID value (e.g., within a FUNCT portion and/or ARG portion of the SID value) based on the information indicating the structure of the SID value.

As shown by reference number 142, the interworking network device may modify the traffic (e.g., based on modifying the SID value). In some implementations, the interworking network device may modify the traffic to cause the traffic to include, along with the label, the SID value (e.g., after modifying the SID value). Additionally, or alternatively, the interworking network device may modify the traffic to cause the traffic to not include the tunnel label, the first label, and the second label. In some implementations, the interworking network device may to cause the payload to be encapsulated in IPv6 with the SID value in an IPv6 header, such as with the SID value indicated as a destination address of the traffic.

As shown by reference number 144, the interworking network device may send the traffic to the PE network device PE2 (e.g., based on modifying the traffic). For example, the interworking network device may send the traffic (e.g., after modifying the traffic) to the PE network device PE2 (e.g., as a next hop along the path to the PE network device PE2). Accordingly, the PE network device PE2 may receive the traffic from the interworking network device (e.g., as a result of the interworking network device sending the traffic).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
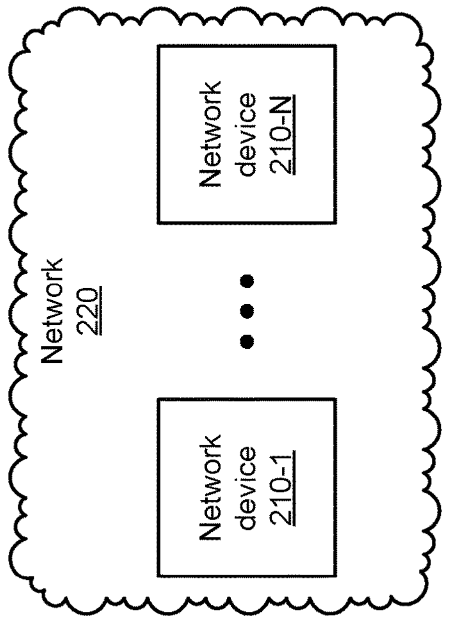
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may a group of network devices 210 (shown as network device 210-1 through network device 210-N) and a network 220. Devices of environment 200 may interconnect via wired connections, wireless connections, or a combination of wired and wireless connections.

Network device 210 includes one or more devices capable of receiving, processing, storing, routing, and/or providing routes and/or traffic in a manner described herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. Network device 210 may be a PE network device, and interworking network device, or another type of network device associated with an MPLS domain and/or an SRv6 domain. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN)), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. Network 220 may be associated with (e.g., may include) one or more domains.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
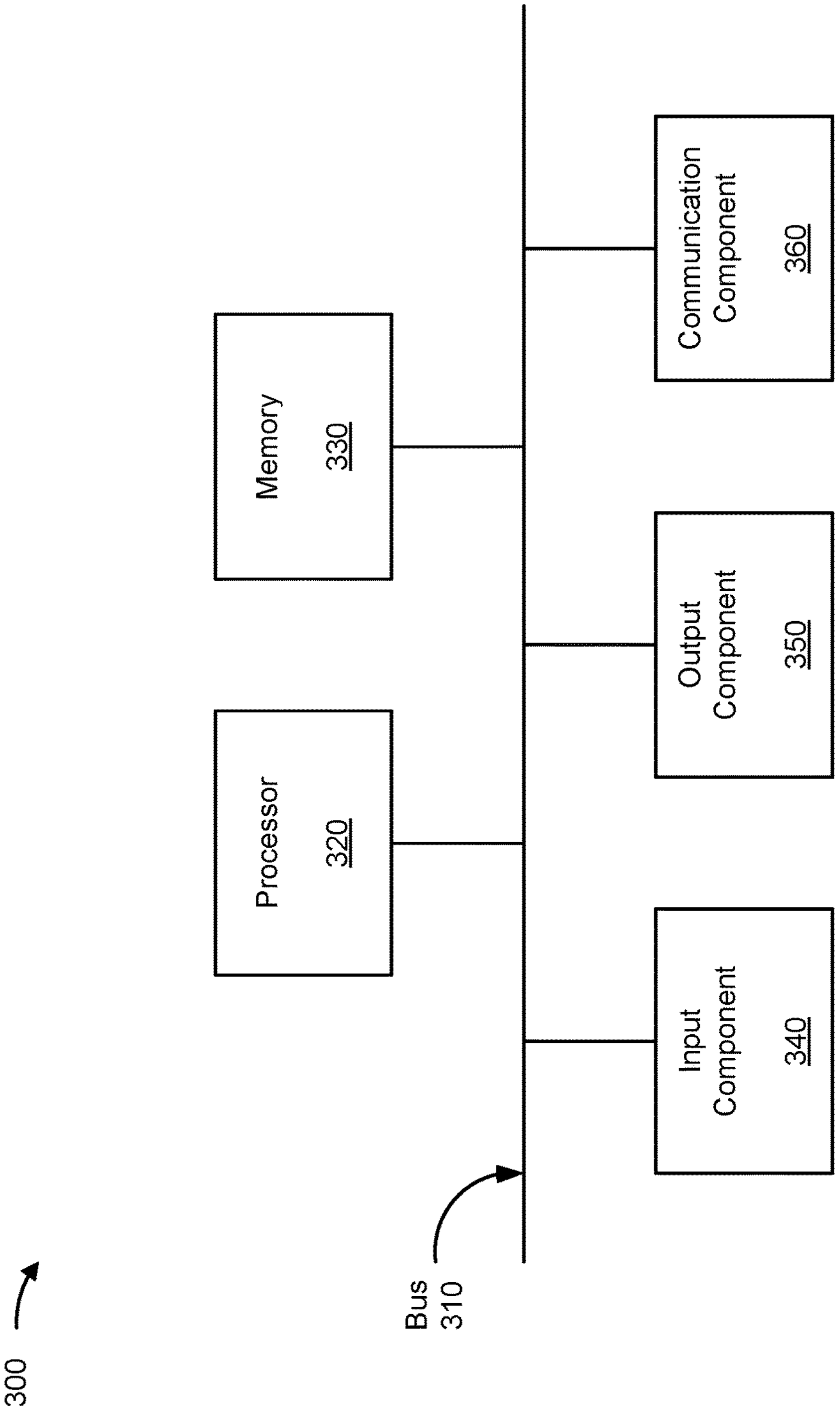
FIG. 3 is a diagram of example components of a device associated with service interworking.

FIG. 3 is a diagram of example components of a device 300 associated with service interworking. The device 300 may correspond to network device 210. In some implementations, network device 210 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
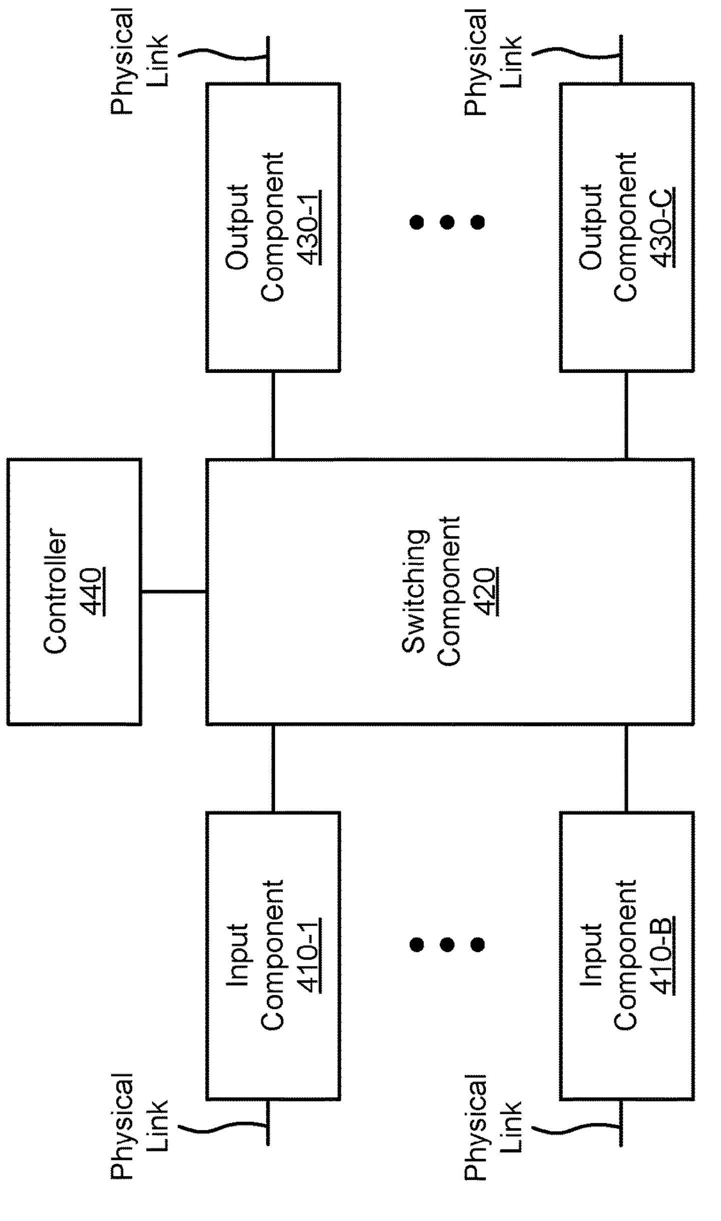
FIG. 4 is a diagram of example components of a device associated with service interworking.

FIG. 4 is a diagram of example components of a device 400 associated with service interworking. Device 400 may correspond to network device 210. In some implementations, network device 210 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor.

The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
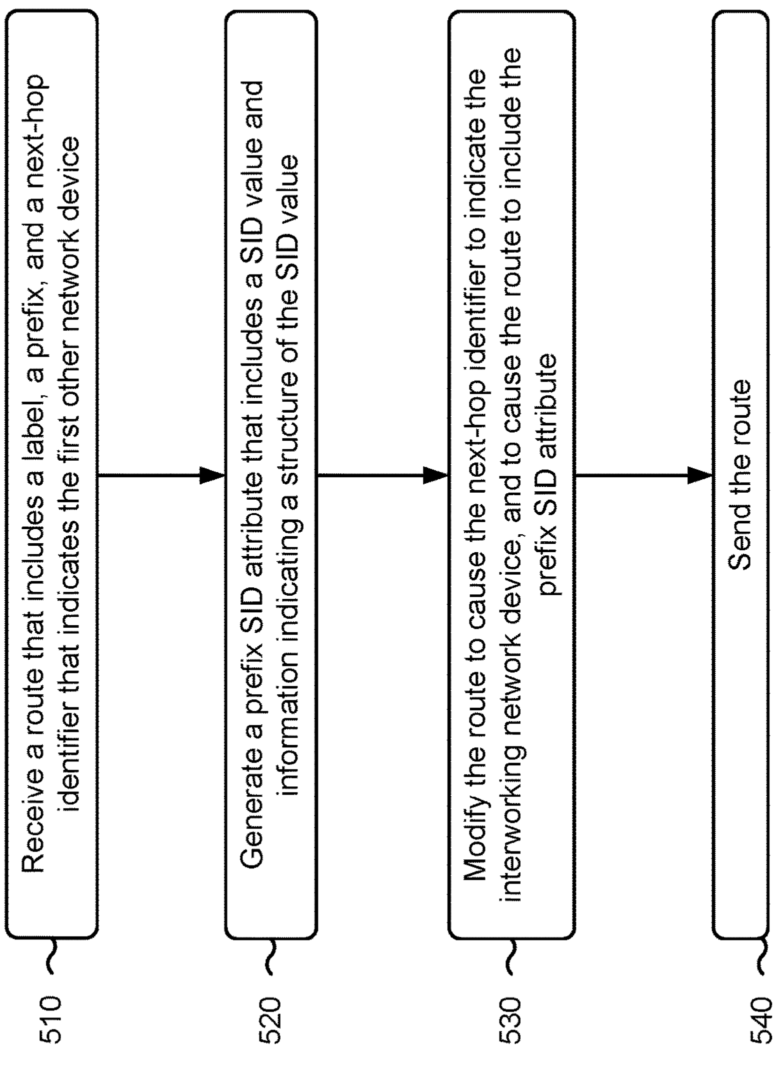
FIGS. 5-7 are each a flowchart of an example process associated with service interworking.

FIG. 5 is a flowchart of an example process 500 associated with service interworking. In some implementations, one or more process blocks of FIG. 5 are performed by an interworking network device (e.g., a network device 210 configured as an interworking network device). In some implementations, one or more process blocks of FIG. 5 are performed by another device or a group of devices separate from or including the network device, such as a first other network device associated with an MPLS domain and/or a second other network device associated with an SRv6 domain. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 5, process 500 may include receiving a route that includes a label, a prefix, and a next-hop identifier that indicates the first other network device (block 510). For example, the interworking network device may receive from the first other network device, a route that includes a label, a prefix, and a next-hop identifier that indicates the first other network device, as described above.

As further shown in FIG. 5, process 500 may include generating, a prefix SID attribute that includes a SID value and information indicating a structure of the SID value (block 520). For example, the interworking network device may generate, based on receiving the route, a prefix SID attribute that includes a SID value and information indicating a structure of the SID value, as described above. In some implementations, a LOC portion of the SID value identifies the interworking network device, and a first sub-portion of a FUNCT portion of the SID value identifies an endpoint behavior of the interworking network device in association with the first other network device.

As further shown in FIG. 5, process 500 may include modifying the route to cause the next-hop identifier to indicate the interworking network device, and to cause the route to include the prefix SID attribute (block 530). For example, the interworking network device may modify the route to cause the next-hop identifier to indicate the interworking network device, and to cause the route to include the prefix SID attribute, as described above.

As further shown in FIG. 5, process 500 may include sending the route (block 540). For example, the interworking network device may send, based on modifying the route, the route to the second other network device, as described above.

Process 500 may include additional implementations, such as any single implementation or any combination of implementations described below and/or in connection with one or more other processes described elsewhere herein.

In a first implementation, process 500 includes the prefix SID attribute includes an SRv6 service TLV, an SRv6 SID information sub-TLV includes the SID value, and an SRv6 SID structure sub-sub-TLV includes the information indicating the structure of the SID value.

In a second implementation, alone or in combination with the first implementation, process 500 includes receiving, after sending the route to the second other network device, traffic that includes another SID value and a payload encapsulated in IPv6, wherein a LOC portion of the other SID value identifies the interworking network device, and a first sub-portion of a FUNCT portion of the other SID value identifies the endpoint behavior of the interworking network device in association with the first other network device, determining, based on the first sub-portion of the FUNCT portion of the other SID value, a label stack associated with a tunnel between the interworking network device and the first other network device, modifying the traffic to cause the traffic to be decapsulated and to include, along with the payload, the label stack and a second sub-portion of the FUNCT portion of the other SID value as an additional label following the label stack, and to not include the other SID, and sending, based on modifying the traffic, the traffic to the first other network device via the tunnel between the interworking network device and the first other network device.

In a third implementation, alone or in combination with one or more of the first and second implementations, process 500 includes receiving, from the second other network device, another route that includes a first other label, a first other prefix, a first other next-hop identifier that indicates the second other network device, and another prefix SID attribute that includes another SID value and information indicating a structure of the other SID value, modifying the other route to cause the other next-hop identifier to indicate an address associated with the other SID value that is included in the other prefix SID attribute, and to cause the route to not include the other prefix SID attribute, and sending, based on modifying the other route, the other route to the first other network device.

In a fourth implementation, alone or in combination with one or more of the first through third implementations, process 500 includes generating an additional route that includes a second other label, a second other prefix for the address associated with the other SID value, and a second other next-hop identifier that indicates the interworking network device, and sending the additional route to the first other network device.

In a fifth implementation, alone or in combination with one or more of the first through fourth implementations, modifying the other route comprises causing the route to further include a composite tunnel in a tunnel encapsulation attribute that includes an identifier of the interworking network device, and an additional label allocated for the SID value included in the prefix SID.

In a sixth implementation, alone or in combination with one or more of the first through fifth implementations, process 500 includes receiving, after sending the other route to the first other network device, traffic that includes a tunnel label associated with a tunnel from the first other network device to the interworking network device, a first label, a second label, and a payload, identifying, based on the first label, the other SID value and the information indicating the structure of the other SID value, modifying, based on identifying the other SID value and the information indicating the structure of the other SID value, the SID value to include the second label, modifying, based on modifying the other SID value, the traffic to cause the payload to be encapsulated in IPv6 with the other SID value in an IPv6 header, and to not include the tunnel label, the first label, and the second label, and sending, based on modifying the traffic, the traffic to the second other network device.

In a seventh implementation, alone or in combination with one or more of the first through sixth implementations, the first label includes a second other label of an additional route generated in association with the SID value in the other route by the interworking network device, and the second label includes the first other label of the other route.

In an eighth implementation, alone or in combination with one or more of the first through seventh implementations, the first label includes an additional label of a composite tunnel of a tunnel encapsulation attribute included in the other route, and the second label includes the first other label of the other route.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
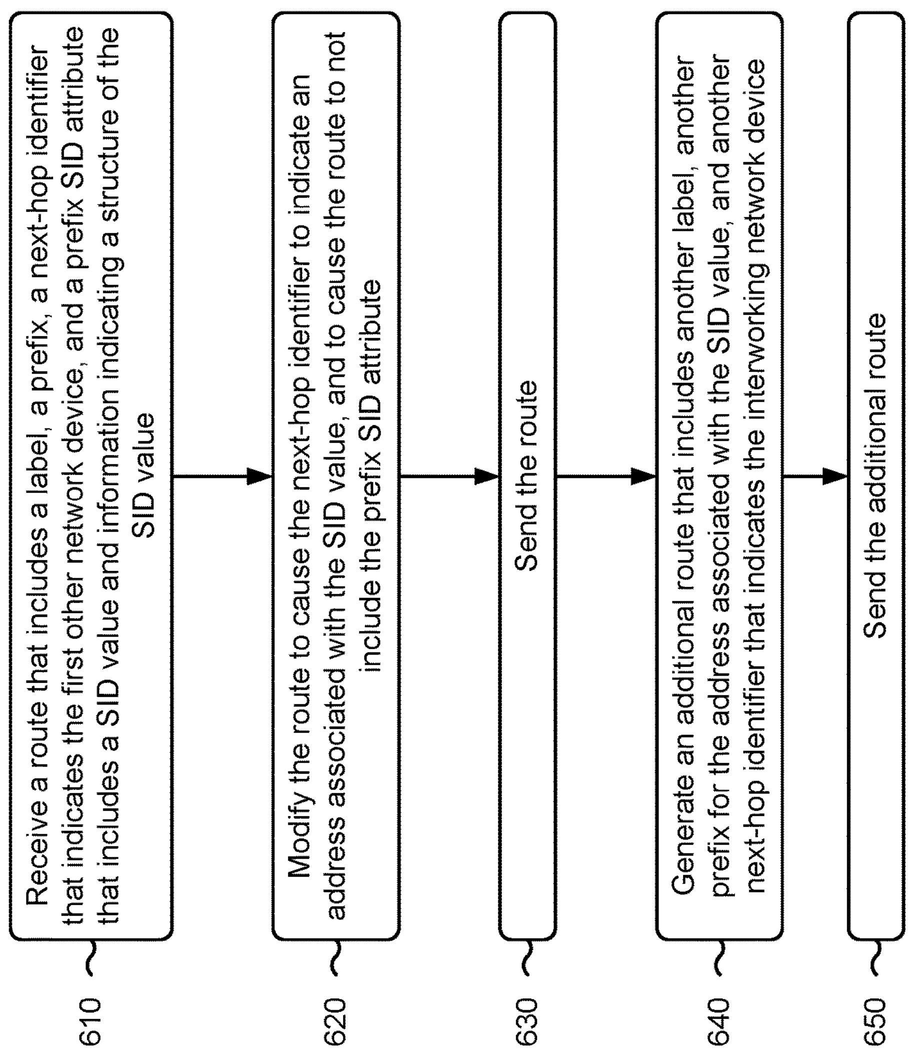

FIG. 6 is a flowchart of an example process 600 associated with service interworking. In some implementations, one or more process blocks of FIG. 6 are performed by an interworking network device (e.g., a network device 210 configured as an interworking network device). In some implementations, one or more process blocks of FIG. 6 are performed by another device or a group of devices separate from or including the network device, such as a first other network device associated with an SRv6 domain and/or a second other network device associated with an MPLS domain. Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 6, process 600 may include receiving a route that includes a label, a prefix, a next-hop identifier that indicates the first other network device, and a prefix SID attribute that includes a SID value and information indicating a structure of the SID value (block 610). For example, the interworking network device may receive, from the first other network device, a route that includes a label, a prefix, a next-hop identifier that indicates the first other network device, and a prefix SID attribute that includes a SID value and information indicating a structure of the SID value, as described above.

As further shown in FIG. 6, process 600 may include modifying the route to cause the next-hop identifier to indicate an address associated with the SID value, and to cause the route to not include the prefix SID attribute (block 620). For example, the interworking network device may modify the route to cause the next-hop identifier to indicate an address associated with the SID value, and to cause the route to not include the prefix SID attribute, as described above.

As further shown in FIG. 6, process 600 may include sending the route (block 630). For example, the interworking network device may send, based on modifying the route, the route to the second other network device, as described above.

As further shown in FIG. 6, process 600 may include generating an additional route that includes another label, another prefix for the address associated with the SID value, and another next-hop identifier that indicates the interworking network device (block 640). For example, the interworking network device may generate an additional route that includes another label, another prefix for the address associated with the SID value, and another next-hop identifier that indicates the interworking network device, as described above.

As further shown in FIG. 6, process 600 may include sending the additional route (block 650). For example, the interworking network device may send the additional route to the second other network device, as described above.

Process 600 may include additional implementations, such as any single implementation or any combination of implementations described below and/or in connection with one or more other processes described elsewhere herein.

In a first implementation, process 600 includes receiving, after sending the route to the second other network device, traffic that includes a tunnel label associated with a tunnel from the second other network device to the interworking network device, a first label, a second label, and a payload, identifying, based on the first label, the SID value and the information indicating the structure of the SID value, modifying, based on identifying the SID value and the information indicating the structure of the SID value, the SID value to include the second label, modifying, based on modifying the SID value, the traffic to cause the payload to be encapsulated in IPv6 with the SID value in an IPv6 header, and sending, based on modifying the traffic, the traffic to the first other network device.

In a second implementation, alone or in combination with the first implementation, process 600 includes the first label includes another label of an additional route generated in association with the SID value in the route by the interworking network device, and the second label includes the label of the route.

In a third implementation, alone or in combination with one or more of the first and second implementations, process 600 includes receiving, from the second other network device, another route that includes another label, another prefix, and another next-hop identifier that indicates the second other network device, generating, based on receiving the other route, another prefix SID attribute that includes another SID value and information indicating a structure of the other SID value, wherein a LOC portion of the other SID value identifies the interworking network device, and a first sub-portion of a FUNCT portion of the other SID value identifies an endpoint behavior of the interworking network device in association with the second other network device, modifying the other route to cause the other next-hop identifier to indicate the interworking network device, and to cause the other route to include the other prefix SID attribute, and sending, based on modifying the other route, the other route to the first other network device associated.

In a fourth implementation, alone or in combination with one or more of the first through third implementations, process 600 includes receiving, after sending the other route to the first other network device, traffic that includes a particular SID value and a payload encapsulated in IPv6, wherein a LOC portion of the particular SID value identifies the interworking network device, and a first sub-portion of a FUNCT portion of the particular SID value identifies the endpoint behavior of the interworking network device in association with the second other network device, determining, based on the first sub-portion of the FUNCT portion of the particular SID value, a label stack associated with a tunnel between the interworking network device and the second other network device, modifying the traffic to cause the traffic to be decapsulated and to include, along with the payload, the label stack and a second sub-portion of the FUNCT portion of the particular SID as an additional label following the label stack, and to not include the other SID, and sending, based on modifying the traffic, the traffic to the second other network device via the tunnel between the interworking network device and the second other network device.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
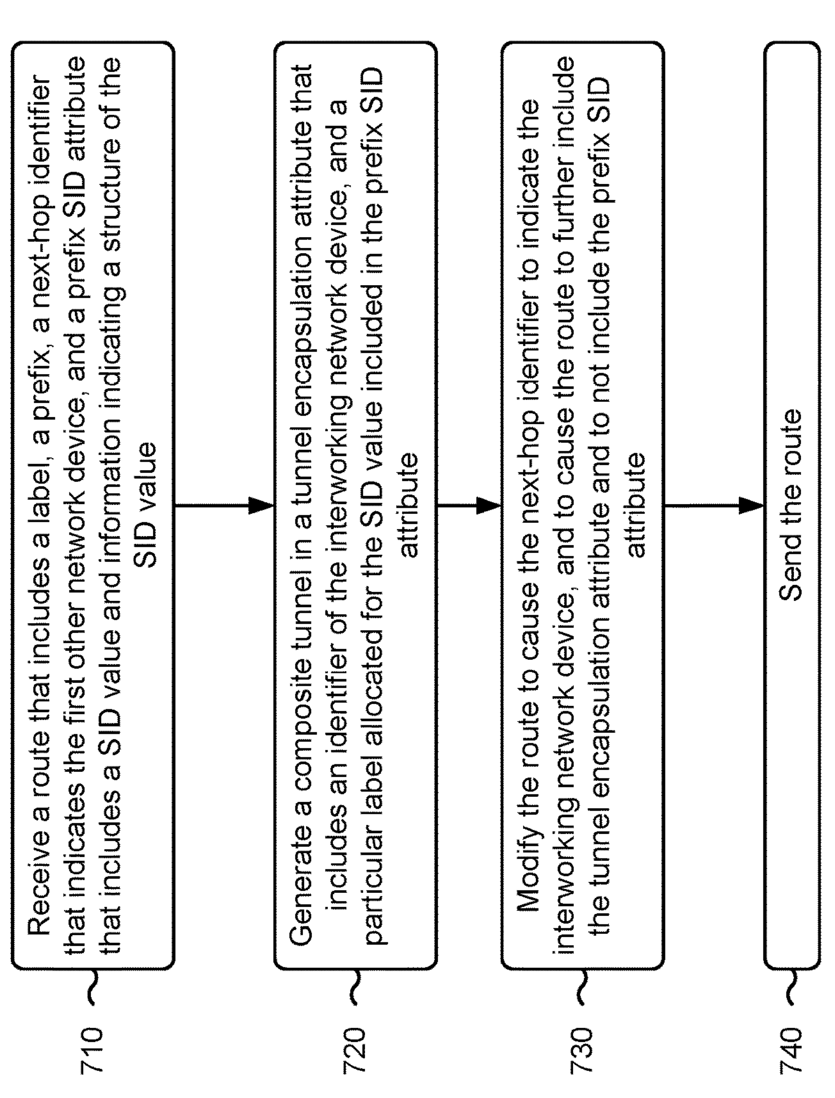

FIG. 7 is a flowchart of an example process 700 associated with service interworking. In some implementations, one or more process blocks of FIG. 7 are performed by an interworking network device (e.g., a network device 210 configured as an interworking network device). In some implementations, one or more process blocks of FIG. 7 are performed by another device or a group of devices separate from or including the network device, such as a first other network device associated with an SRv6 domain and/or a second other network device associated with an MPLS domain. Additionally, or alternatively, one or more process blocks of FIG. 7 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 7, process 700 may include receiving a route that includes a label, a prefix, a next-hop identifier that indicates the first other network device, and a prefix SID attribute that includes a SID value and information indicating a structure of the SID value (block 710). For example, the interworking network device may receive, from the first other network device associated, a route that includes a label, a prefix, a next-hop identifier that indicates the first other network device, and a prefix SID attribute that includes a SID value and information indicating a structure of the SID value, as described above.

As further shown in FIG. 7, process 700 may include generating a composite tunnel in a tunnel encapsulation attribute that includes an identifier of the interworking network device, and a particular label allocated for the SID value included in the prefix SID attribute (block 720). For example, the interworking network device may generate, based on receiving the route, a composite tunnel in a tunnel encapsulation attribute that includes an identifier of the interworking network device, and a particular label allocated for the SID value included in the prefix SID attribute, as described above.

As further shown in FIG. 7, process 700 may include modifying the route to cause the next-hop identifier to indicate the interworking network device, and to cause the route to further include the tunnel encapsulation attribute and to not include the prefix SID attribute (block 730). For example, the interworking network device may modify the route to cause the next-hop identifier to indicate the interworking network device, and to cause the route to further include the tunnel encapsulation attribute and to not include the prefix SID attribute, as described above.

As further shown in FIG. 7, process 700 may include sending the route (block 740). For example, the interworking network device may send, based on modifying the route, the route to the second other network device, as described above.

Process 700 may include additional implementations, such as any single implementation or any combination of implementations described below and/or in connection with one or more other processes described elsewhere herein.

In a first implementation, process 700 includes receiving, after sending the route to the second other network device, traffic that includes a tunnel label associated with a tunnel from the second other network device to the interworking network device, a first label, a second label, and a payload, identifying, based on the first label, the SID value and the information indicating the structure of the SID value, modifying, based on identifying the SID value and the information indicating the structure of the SID value, the SID value to include the second label, modifying, based on modifying the SID value, the traffic to cause the payload to be encapsulated in IPv6 with the other SID value in an IPv6 header, and to not include the tunnel label, the first label, and the second label, and sending, based on modifying the traffic, the traffic to the first other network device.

In a second implementation, alone or in combination with the first implementation, process 700 includes the first label includes the particular label of the tunnel encapsulation attribute, and the second label includes the label of the route.

In a third implementation, alone or in combination with one or more of the first and second implementations, process 700 includes receiving, from the second other network device, another route that includes another label, another prefix, and another next-hop identifier that indicates the second other network device, generating, based on receiving the other route, another prefix SID attribute that includes another SID value and information indicating a structure of the other SID value, wherein a LOC portion of the other SID value identifies the interworking network device, and a first sub-portion of a FUNCT portion of the other SID value identifies an endpoint behavior of the interworking network device in association with the second other network device, modifying the other route to cause the other next-hop identifier to indicate the interworking network device, and to cause the other route to include the other prefix SID attribute, and sending, based on modifying the other route, the other route to the first other network device associated.

In a fourth implementation, alone or in combination with one or more of the first through third implementations, process 700 includes receiving, after sending the other route to the first other network device, traffic that includes a particular SID value and a payload encapsulated in IPv6, wherein a LOC portion of the particular SID value identifies the interworking network device, and a first sub-portion of a FUNCT portion of the particular SID value identifies the endpoint behavior of the interworking network device in association with the second other network device, determining, based on the first sub-portion of the FUNCT portion of the particular SID value, a label stack associated with a tunnel between the interworking network device and the second other network device, modifying the traffic to cause the traffic to be decapsulated and to include, along with the payload, the label stack and a second sub-portion of the FUNCT portion of the particular SID as an additional label following the label stack, and to not include the other SID, and sending, based on modifying the traffic, the traffic to the second other network device via the tunnel between the interworking network device and the second other network device.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method by an interworking device, comprising:

generating, based on receiving from a first device associated with a multi-protocol label switching (MPLS) domain a route that includes a next-hop identifier that indicates the first device, a prefix segment identifier (SID) attribute that includes a SID value;

modifying the route to cause the next-hop identifier to indicate the interworking device, and to cause the route to include the prefix SID attribute;

sending the modified route to a second device associated with a segment routing over Internet protocol (IP) version 6 (SRv6) domain;

receiving, from the second device, traffic that includes another SID value and a payload encapsulated in IP version 6 (IPv6);

determining, based on a first sub-portion of a FUNCT portion of the other SID value, an endpoint behavior;

determining, based on performing the endpoint behavior, a label stack associated with a tunnel between the first device and the interworking device; and modifying the traffic to cause the traffic to be decapsulated and to include, along with the payload, the label stack and a second sub-portion of the FUNCT portion of the other SID value as an additional label following the label stack, and to not include the other SID value.

2. The method of claim 1, wherein:

the prefix SID attribute includes an SRv6 service TLV, an SRv6 SID information sub-TL V includes the SID value, and an SRv6 SID structure sub-sub-TLV includes the information indicating the structure of the SID value.

3. The method of claim 1, wherein the traffic from the second device includes information indicating a structure of the other SID value.

4. The method of claim 1, further comprising:

receiving, from the second device, a first other route including a first other next-hop identifier that indicates the second device;

modifying the first other route to cause the first other next-hop identifier to not indicate the second device; and sending the modified first other route to the first device.

5. The method of claim 4, wherein the first other route further includes a first other prefix SID attribute including a first other SID value, and wherein the method further comprises:

generating a second other route that includes a second other label indicating an address associated with the first other SID value and a second other next-hop identifier that indicates the interworking device.

6. The method of claim 1, further comprising:

receiving, from the second device, a first other route including a first other next-hop identifier that indicates the second device and includes a first other prefix SID attribute including a first other SID value;

generate a tunnel encapsulation attribute; and modify the first other route to cause the first other next-hop identifier to indicate only the interworking device, and to cause the first other route to include a tunnel encapsulation attribute.

7. The method of claim 6, further comprising:

sending the modified first other route to the first device.

8. The method of claim 6, further comprising:

sending the modified first other route to the first device as part of an advertising process to distribute routes to other network devices connected to the interworking device and not associated with the Srv6 domain.

9. The method of claim 1, further comprising:

receiving another traffic that includes a tunnel label associated with a tunnel to the device, and another payload;

modifying the other traffic to cause the payload to not include the tunnel label; and sending the modified other traffic to the second device.

10. The method of claim 9, wherein modifying the other traffic further includes causing the other traffic to be encapsulated in IPv6.

11. A non-transitory computer-readable medium storing a set of instructions, the set of instructions comprising:

one or more instructions that, when executed by one or more processors of an interworking device, cause the interworking device to:

generate, based on receiving from a first device associated with a multi-protocol label switching (MPLS) domain a route that includes a next-hop identifier that indicates the first device, a prefix segment identifier (SID) attribute that includes a SID value;

modifying the route to cause the next-hop identifier to indicate the interworking device and to cause the route to include the prefix SID attribute;

sending the modified route to a second device associated with a segment routing over Internet protocol (IP) version 6 (SRv6) domain;

receiving, from the second device, traffic that includes another SID value and a payload encapsulated in IP version 6 (IPv6);

determining, based on a first sub-portion of a FUNCT portion of the other SID value, an endpoint behavior;

determining, based on performing the endpoint behavior, a label stack associated with a tunnel between the first device and the interworking device; and modifying the traffic to cause the traffic to be decapsulated and to include, along with the payload, the label stack and a second sub-portion of the FUNCT portion of the other SID value as an additional label following the label stack, and to not include the other SID value.

12. The non-transitory computer-readable medium of claim 11, wherein the one or more instructions, when executed by the one or more processors, further cause the interworking device to:

receive, from the second device, a first other route including a first other next-hop identifier that indicates the second device;

modify the first other route to cause the first other next-hop identifier to not indicate the second device; and sending the modified first other route to the first device.

13. The non-transitory computer-readable medium of claim 12, wherein the first other route further includes a first other prefix SID attribute including a first other SID value, and wherein the one or more instructions, when executed by the one or more processors, further cause the interworking device to:

generating a second other route that includes a second other label indicating an address associated with the first other SID value and a second other next-hop identifier that indicates the interworking device.

14. The non-transitory computer-readable medium of claim 11, wherein the one or more instructions, when executed by the one or more processors, further cause the interworking device to:

receive, from the second device, a first other route including a first other next-hop identifier that indicates the second device and includes a first other prefix SID attribute including a first other SID value;

generate a tunnel encapsulation attribute; and modify the first other route to cause the first other next-hop identifier to indicate only the interworking device, and to cause the first other route to include a tunnel encapsulation attribute.

15. The non-transitory computer-readable medium of claim 14, herein the one or more instructions, when executed by the one or more processors, further cause the interworking device to:

send the modified first other route to the first device as part of an advertising process to distribute routes to other network devices connected to the interworking device and not associated with the Srv6 domain.

16. The non-transitory computer-readable medium of claim 11, wherein the one or more instructions, when executed by the one or more processors, further cause the interworking device to:

receive another traffic that includes a tunnel label associated with a tunnel to the device, and another payload;

modify the other traffic to cause the payload to not include the tunnel label; and send the modified other traffic to the second device.

17. An interworking device, comprising:

one or more memories; and one or more processors to:

generate, based on receiving from a first device associated with a multi-protocol label switching (MPLS) domain a route that includes a next-hop identifier that indicates the first device, a prefix segment identifier (SID) attribute that includes a SID value;

modifying the route to cause the next-hop identifier to indicate the interworking device and to cause the route to include the prefix SID attribute;

sending the modified route to a second device associated with a segment routing over Internet protocol (IP) version 6 (SRv6) domain;

receiving, from the second device, traffic that includes another SID value and a payload encapsulated in IP version 6 (IPv6);

determining, based on a first sub-portion of a FUNCT portion of the other SID value, an endpoint behavior;

determining, based on performing the endpoint behavior, a label stack associated with a tunnel between the first device and the interworking device; and modifying the traffic to cause the traffic to be decapsulated and to include, along with the payload, the label stack and a second sub-portion of the FUNCT portion of the other SID value as an additional label following the label stack, and to not include the other SID value.

18. The interworking device of claim 17, wherein the one or more processors are further to:

receive, from the second device, a first other route including a first other next-hop identifier that indicates the second device;

modify the first other route to cause the first other next-hop identifier to not indicate the second device; and sending the modified first other route to the first device.

19. The interworking device of claim 18, wherein the first other route further includes a first other prefix SID attribute including a first other SID value, and wherein the one or more processors are further to:

generating a second other route that includes a second other label indicating an address associated with the first other SID value and a second other next-hop identifier that indicates the interworking device.

20. The interworking device of claim 17, wherein the one or more processors are further to:

receive, from the second device, a first other route including a first other next-hop identifier that indicates the second device and includes a first other prefix SID attribute including a first other SID value;

generate a tunnel encapsulation attribute; and modify the first other route to cause the first other next-hop identifier to indicate only the interworking device, and to cause the first other route to include a tunnel encapsulation attribute.

* * * * *